United States Patent
Sarris (10) Patent No.: US 10,604,900 B2
(45) Date of Patent: Mar. 31, 2020

(54) MIXED TURF

(71) Applicant: Nikolaos Sarris, Bollate (IT)

(72) Inventor: Nikolaos Sarris, Bollate (IT)

( * ) Notice: Subject to any disclaimer, the term of this patent is extended or adjusted under 35 U.S.C. 154(b) by 156 days.

(21) Appl. No.: 14/377,904

(22) PCT Filed: Feb. 12, 2013

(86) PCT No.: PCT/IB2013/051136
§ 371 (c)(1),
(2) Date: Aug. 11, 2014

(87) PCT Pub. No.: WO2013/121348
PCT Pub. Date: Aug. 22, 2013

(65) Prior Publication Data
US 2015/0047259 A1 Feb. 19, 2015

(30) Foreign Application Priority Data
Feb. 13, 2012 (EP) .................................... 12155131

(51) Int. Cl.
*E01C 13/08* (2006.01)
*E02B 11/00* (2006.01)

(52) U.S. Cl.
CPC ............ *E01C 13/083* (2013.01); *E02B 11/00* (2013.01); *E01C 2013/086* (2013.01)

(58) Field of Classification Search
CPC .. E01C 13/08; E01C 13/083; E01C 2013/086; A01G 1/005; A01G 1/002; A01G 20/00; E02B 11/00
See application file for complete search history.

(56) References Cited

U.S. PATENT DOCUMENTS

| | | | | |
|---|---|---|---|---|
| 5,064,308 A | * | 11/1991 | Almond | E01C 13/083 405/36 |
| 5,489,317 A | * | 2/1996 | Bergevin | A63C 19/04 47/1.01 R |
| 6,094,860 A | * | 8/2000 | Motz | E01C 13/083 405/302.7 |
| 6,216,389 B1 | * | 4/2001 | Motz | E01C 13/083 428/17 |

(Continued)

FOREIGN PATENT DOCUMENTS

FR 2 244 356 A5 4/1975
FR 2 932 196 A1 12/2009

(Continued)

OTHER PUBLICATIONS

The International Search Report for International Application No. PCT/IB2013/051136, two pages, dated Aug. 6, 2013.

*Primary Examiner* — Christopher D Hutchens
(74) *Attorney, Agent, or Firm* — Vorys, Sater, Seymour & Pease LLP (57) ABSTRACT

Provided is a mixed turf arranged on a soil and including: a synthetic turf, natural grass arranged in the synthetic turf, said synthetic turf including: synthetic filaments suitable to simulate grass blades and a backing consisting of a membrane suitable to support the synthetic filaments, the backing being further as a whole substantially draining, enabling transpiration and permitting the passage therethrough of the roots of said natural grass and which is non-biodegradable.

17 Claims, 4 Drawing Sheets

(56) References Cited

U.S. PATENT DOCUMENTS

| | | | | |
|---|---|---|---|---|
| 6,242,062 | B1* | 6/2001 | de Vries | E01C 13/08 139/391 |
| 6,691,455 | B1* | 2/2004 | Bergevin | A63C 19/04 428/17 |
| 2003/0039511 | A1* | 2/2003 | Prevost | E01C 13/08 405/36 |
| 2007/0248773 | A1* | 10/2007 | Nusca | E01C 13/08 428/22 |
| 2012/0279125 | A1* | 11/2012 | Nusca | E01C 13/08 47/66.7 |
| 2015/0033626 | A1* | 2/2015 | Sutherland | E01C 13/083 47/1.01 F |

FOREIGN PATENT DOCUMENTS

| | | | |
|---|---|---|---|
| GB | 2 352 954 A | 2/2001 | |
| WO | 89/01076 A1 | 2/1989 | |
| WO | WO 2012159145 A1 * | 11/2012 | E01C 13/083 |

* cited by examiner

MIXED TURF

The present invention relates to a mixed turf, which is partly synthetic and partly natural, suitable, for example, for covering recreational or sports fields, ornamental or play areas, as described in the preamble of Claim 1.

For practical and economical reasons, traditional natural turf coverings for sports fields and the like are frequently replaced by coverings made of synthetic materials simulating natural turf.

Particularly known are synthetic coverings simulating natural turfs comprising: a support, or backing, consisting of a polymeric membrane to which a plurality of filaments, also made of polymeric material, are fixed by means of a polymeric latex or polyurethane resin which makes the backing impermeable, said filaments extending vertically to simulate natural grass blades. Numerous holes are made in the backing to allow the water to flow towards the underlying layers. These coverings further comprise an infill material arranged on top of the support, consisting of granular material such as sand or the like, which has a stabilising, protecting and cushioning function. The infill and backing are permeable, or draining, and allow any excess water to flow towards the underlying soil.

Also known are mixed turfs, i.e. comprising structures of synthetic material mixed with natural grass, which are more or less efficient and involve high costs for the production and/or maintenance of the turf.

For instance, patent application WO-A-2006/008579 and U.S. Pat. No. 7,943,212 describe a technique for sowing natural grass seeds in the infill on top of the backing of a synthetic covering. In these cases the backing of the synthetic covering is not biodegradable and acts as a barrier for the roots. It therefore prevents the roots of the natural grass from penetrating deeply into the soil. The roots can, in fact, only grow horizontally inside the infill, which is about 4-5 cm thick. These coverings therefore require frequent watering in hot weather. In addition, in hot, wet weather conditions the natural grass could suffocate, thus fostering the development of fungal diseases. When particularly wet weather conditions persist and there is also high biological activity in the soil, the oxygen in the vegetable substrate is depleted more quickly. This fosters anaerobic biological activity capable of capturing the little oxygen present in the sulphur oxides, thus releasing sulphuric acid ($H_2S$), a gas that is toxic for the roots.

These turf coverings require a great amount of care, involving considerable expense. Due to the lack of deep roots, there is the risk of the turf drying out during the hot summer months and, during long periods of wet weather, there is the risk of intoxication from the gases released due to anaerobic bacterial activity. U.S. Pat. No. 6,145,248 discloses techniques for sowing natural grass in synthetic coverings that, in theory, enable the roots of the natural grass to penetrate deeply into the soil due to the biodegradation of the backing of the synthetic turf. To enable this growth, the backing of the synthetic turf is partly biodegradable so as to become more porous in time, thus eventually allowing the roots to grow through it.

However, in this case, said backing loses its strength and there is a gradual reduction in the connection between the synthetic grass and the primary backing, thus eliminating the advantages of mixed turfs. In addition, the decomposition of the materials used, which depends on numerous factors and, in some cases, can take more than two years, contrasts with the need for the turf to grow quickly, usually in 2-3 months during the summer break in the competition season. During the first period, the roots penetrate the underlying support very little or not at all due to the limited circulation of air in the soil owing to the density of the water that deposits on the backing of the synthetic turf which thus forms an invisible water barrier. If the wet weather conditions persist, this fosters anaerobic bacterial activity and the release of gases that are toxic for the roots, as described in the previous case. The geotropic angle of the roots of the grass plants is thus altered so that these tend to grow in a horizontal direction. This fosters the formation of so-called "thatch", which further limits the gaseous exchange between the soil and the air. When the field is used 2-3 months after sowing, the upper layer is compacted even more, which further facilitates the formation of "felt" on the surface, so that the advantages of the synthetic grass are soon eliminated. The problem is difficult to solve and involves the use of equipment that also tends to spoil the structure of the synthetic grass. This method is not widespread due to the high costs of production and maintenance involved.

U.S. Pat. No. 6,372,310 also discloses techniques for sowing natural grass in synthetic turf that, in theory, enables the roots of the natural grass plants to pass through the holes in the backing that supports the synthetic grass blades, formed by enlarged spaces between the warp and weft threads, or due to the decomposition of some of the warp and weft threads in time. The present case differs from the previous one in that the plurality of holes are replaced with large gaps between the weft and warp yarns which are woven in a spaced manner or, in some cases, which are formed in time due to the partial use of biodegradable material. Forming the synthetic grass blades at the intersections of the backing leaves more room for the natural grass to grow on the surface and is more economical as less plastic is used. However, the penetration of the roots into the underlying backing is limited for the same reasons mentioned above for the previous system. The connection of the grass blades to the backing is not guaranteed, according to the results of specific laboratory tests on synthetic grass. Upon close examination, it was observed that, to overcome the weakness of the connection between the fibres and the backing, the fibres are attached by applying a layer of latex resin to the lower part of the groups of rows that contain the synthetic grass fibres, making the backing partially impermeable. The groups of rows with the synthetic fibres alternate with the group of rows made partially with biodegradable fibres and the possibility of obtaining a stable fabric by eliminating a group of warp and/or weft fibres is doubtful. The natural grass dies quickly, before the fabric allows any deep growth of the roots due to intoxication from the gases released by the anaerobic bacterial activity.

Another type of technology, mainly applied to football fields, envisages the introduction of synthetic yarns into the natural grass field when already in use: about 20 million synthetic yarns for a sports field of 7,000 $m^2$ inserted at a depth of up to 20 cm in the sandy soil to better withstand the "traffic" of a football match. Although this method respects agronomic principles for the growth of natural grass, it can only be used in sandy soil, and is a complicated and expensive procedure that also involves the use of specific machinery characterised by low output and high maintenance costs. In large stadiums, major events, such as concerts are organised during the summer months. The field is covered with heavy slabs on which the stage can be erected, but which kill off the natural grass. Growing new grass from seed takes a long time and this is often not compatible with the match schedule. It is therefore preferable to remove the old grass and lay new turf. Since synthetic fibres are present in the first 20 cm of the soil, the entire sand substrate must also be removed and must be disposed of as special waste. Separating the synthetic grass from the sand would also be an expensive process. Material handling alone has a significant effect on the time and costs of laying the new turf and inserting the new synthetic fibres.

Lastly, all of the systems for draining synthetic turf, mixed turf and even numerous natural turf surfaces have the drawback of using drainage systems that deliver rainwater into the sewer system or directly into the water table through absorbing wells, with all the risks resulting therefrom. It is for that reason that natural turf coverings for sports fields and the like, unlike grass fields in the countryside, are regarded as impermeable.

In this situation the technical purpose of the present invention is to devise a mixed turf able to substantially overcome the drawbacks mentioned above. Within the sphere of said technical purpose, an important aim of the invention is to provide a mixed turf that is strong and of a high quality.

Another important aim of the invention is to obtain a mixed turf that is economical and of simple installation and maintenance.

A further aim of the invention is to provide a mixed turf that allows rapid water infiltration into the drainage layers without burdening the sewer system.

The technical purpose and specified aims are achieved with a mixed turf as claimed in the appended Claim 1.

Preferred embodiments are described in the dependent claims.

The characteristics and advantages of the invention are clearly evident from the following detailed description of a preferred embodiment thereof, with reference to the accompanying drawings, in which.

With reference to said drawings, reference numeral 1 globally denotes the mixed turf according to the invention.

Conveniently, it is part of a soil 10 which also comprises a substrate 11, as described below.

The covering 1 is suitable to constitute a substantially grassy surface, for example the surface of a sports field, and preferably of a football field, or also a surface of a playing field, or of an ornamental, decorative or other area.

The mixed turf 1 comprises a synthetic turf 2 and natural grass 3, arranged in said synthetic turf, as described more fully below.

In detail, the synthetic turf 2 comprises a backing 4, described more fully below, and a plurality of synthetic filaments 5 simulating natural grass.

Conveniently, the backing 4 is a draining structure that, above all, enables transpiration in both the wet and dry states. Moreover, the backing 4 is advantageously non-biodegradable, and more preferably fully non-biodegradable, so that the connection of the filaments 5 remains unchanged in time. Furthermore no polymers such as polyurethane or latex are applied to the bottom of said layer, unlike with conventional systems.

The backing 4 also and conveniently has an irregular and jagged surface which increases the upper surface area of said backing 4 thus increasing the surface for interaction with any liquids and, as a consequence, increasing the permeability of said backing 4.

In particular, jagged surfaces minimise the formation of surface tension which may occur on smooth backings and also the formation of a water barrier due to the density of the water.

The backing 4 thus preferably has a three-dimensional shape in which the apertures are not arranged evenly along a continuous surface but are arranged on surfaces with different angles of inclination.

In particular, the backing 4 comprises, in particular on the outside surface, an open-work or net-like fabric made of yarns with a large diameter or a non-woven fabric or a geocomposite, to achieve said characteristics of three-dimensionality and surface unevenness.

In a first example (FIG. 2a), the backing 4 preferably comprises at least one geonet 4a coupled with a geotextile 4b of non-woven fabric.

The coupling of geotextile materials and geonets as a base for synthetic grass is known in the prior art. In particular, both geonets and geotextiles are materials used in agriculture for soil consolidation or for similar purposes. Geotextiles made of non-woven fabric are instead usually made up of extruded filaments arranged in a uniform manner and subsequently needle-felted so as to constitute a felt or the like.

Figure 2A:
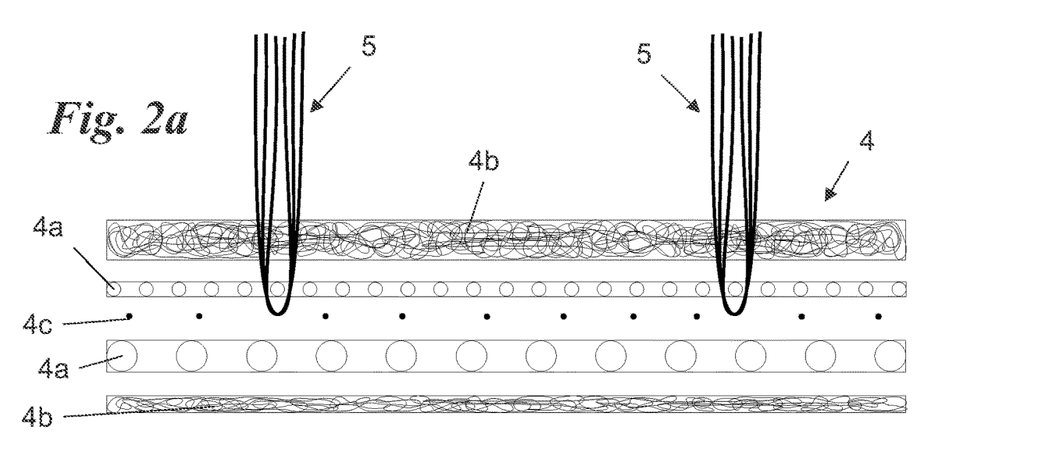
FIG. 2a is an exploded and schematic cross-sectional view of a portion of a first example of a mixed turf according to the invention.

In this case the geonets 4a are of sizes such as to enable the passage of the roots of the natural grass 3, as described more fully below.

In greater detail, there are two geonets 4a, each coupled to a geotextile 4b. The two assemblies of geonets 4a and geotextiles 4b internally enclose the filaments 5 (FIG. 2a). Said filaments 5 are inserted by means of the prior art technique known as tufting, and glued, with melting of polymeric particles 4c and in particular polyethylene, to the geonet 4a coupled to the upper geotextile 4b.

In particular, the outer layers of the backing 4 are both geotextiles.

The upper geonet 4a is preferably made of polyester and has a basis weight comprised between 25 g/m$^2$ and 100 g/m$^2$, and more preferably between 30 g/m$^2$ and 60 g/m$^2$ and square meshes or the like having a width comprised between 0.5 mm and 4 mm.

The upper geotextile 4b is preferably made of polyester and has a basis weight comprised between 80 g/m$^2$ and 300 g/m$^2$, and more preferably between 150 g/m$^2$ and 250 g/m$^2$.

More preferably, the overall basis weight of the geotextile 4b and upper geonet 4a is comprised between 180 g/m$^2$ and 310 g/m$^2$.

The lower geonet 4a is preferably made of polyester and has a basis weight comprised between 30 g/m$^2$ and 120 g/m$^2$, and more preferably between 35 g/m$^2$ and 70 g/m$^2$ and square meshes or the like having a width comprised between 2 mm and 6 mm.

The lower geotextile 4b is preferably made of polyester and has a basis weight comprised between 20 g/m$^2$ and 100 g/m$^2$, and more preferably between 40 g/m$^2$ and 80 g/m$^2$.

More preferably, the overall basis weight of the geotextile 4b and lower geonet 4a is comprised between 75 g/m² and 150 g/m².

The synthetic filaments 5 are preferably stitched by means of said tufting to said geonet 4a coupled to the upper geotextile 4b and preferably arranged in groups of filaments 5a. Conveniently, they are between 4 cm and 7 cm in length and are preferably made of softer new-generation polyethylene, with special ribs to ensure greater resilience. The space between the synthetic filaments 5 is optimised so that there is room for the natural grass 3 to grow. In particular, the synthetic filaments 5 are arranged in parallel rows spaced at distances of between 1 cm and 6 cm and more preferably of between 2 cm and 4 cm. Moreover, in some areas, for example in the parts of a football field exposed to the heaviest wear, such as the goal areas, the synthetic filaments 5 may be arranged closer together. In particular, the synthetic filaments 5 do not exceed, in terms of arrangement density in the soil, 10%-30% of the arrangement density of the natural grass 3 having the desired density.

In a second example (FIGS. 2b-2d) the backing 4 consists of a net-like or open-work fabric having a warp consisting of first yarns 40, preferably in polypropylene, having a diameter comprised between 3 mm and 0.3 mm and in particular between 1.8 mm and 0.7 mm. The distance between the first yarns 40 is preferably between 3 mm and 8 mm and, more preferably, between 4 mm and 5 mm.

Figure 2B:
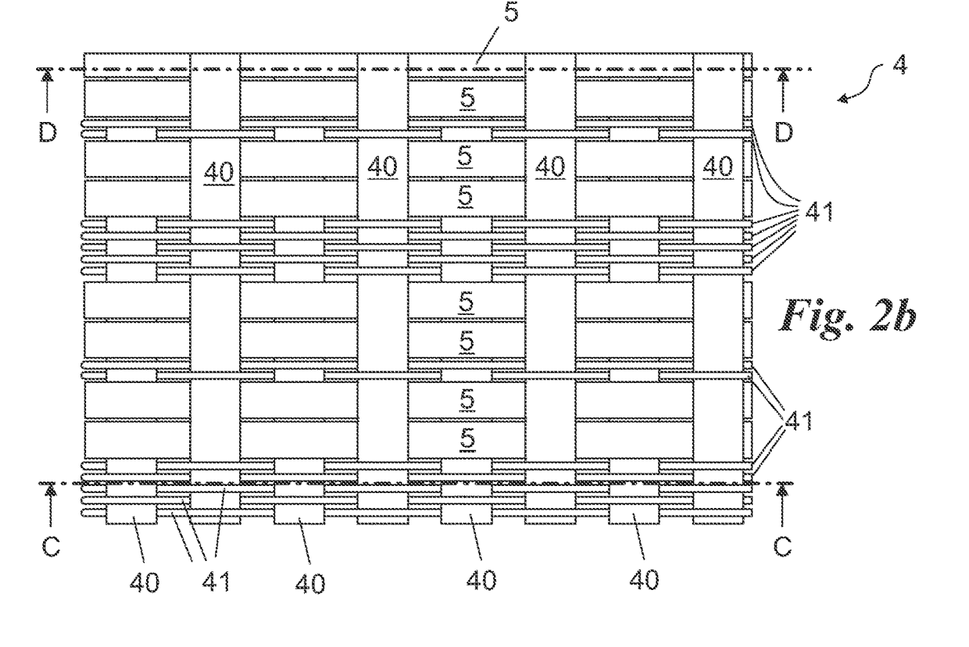
FIG. 2b is a view from above of a portion of a second example of a mixed turf according to the invention.
Figure 2C:
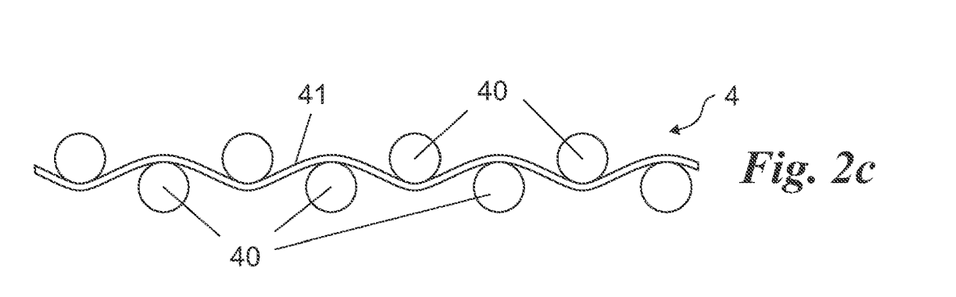
FIG. 2c is a cross-sectional view along the line marked c-c in FIG. 2b.
Figure 2D:
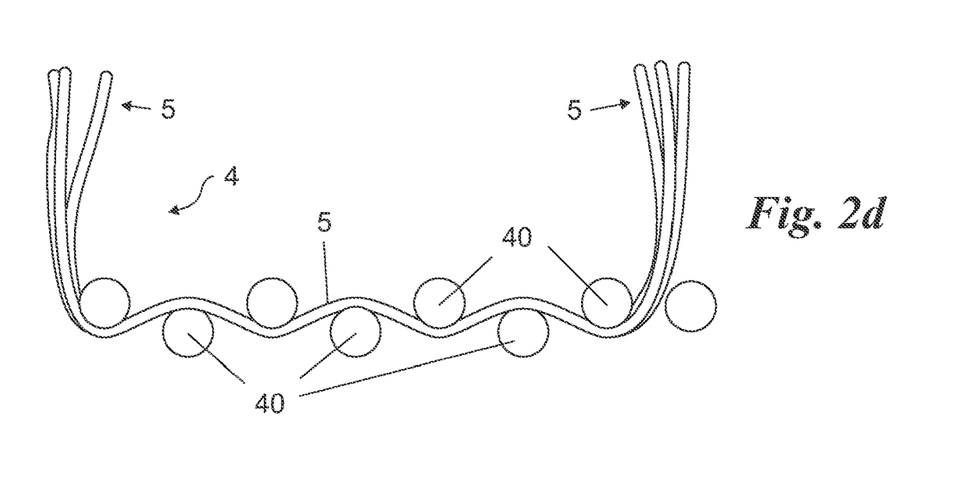
FIG. 2d is a cross-sectional view along the line marked d-d in FIG. 2b.

Moreover, the first yarns 40 are preferably at different levels, and preferably two levels, at different heights and thus not aligned on the same plane.

The weft of said fabric consists of second yarns 41, preferably in polyester or polypropylene, having a diameter comprised between 0.1 mm and 1.5 mm and more in particular between 0.7 mm and 0.3 mm.

The weft is also preferably composed of the fibres that constitute the synthetic filaments 5, which cross a number comprised between 15 and 4 of first yarns 40 and protrude from both ends by several centimetres, so as to form the synthetic filaments 5. The filaments are also preferably in groups of three.

The distance between the first yarns 40 is preferably between 0.2 mm and 4 mm and, more preferably, between 0.4 mm and 1 mm. Said method, in which the synthetic filaments 5 are woven into the backing 4 and are an integral part thereof, is also referred to as the woven method.

Said net and backing are also held together by means of an adhesive applied to the net so as not to fill the spaces obtained between the warp and the weft thanks to the open-work fabric and three-dimensional shape between the stitches.

The backing 4 is as a whole substantially permeable to water and, above all, enables transpiration and allows the gasses in the soil to circulate freely. The term "as a whole" refers to the fact that the whole surface, on a macroscopic scale, of the backing has the characteristics of permeability and enabling transpiration, owing to the choice of the microscopic features of the backing: in particular, the three-dimensional shape of the backing which prevents the formation of a water barrier due to the density of the water on top of the backing. Therefore this is not left merely to holes or macroscopic apertures in the backing, as is the case with the prior art backings.

The soil 10 further comprises an upper layer 7 arranged on top of the backing 4 and a lower layer 8 which supports the backing 4 and therefore comes into contact with said backing 4 and with the upper layer 7.

Conveniently, the upper layer 7 is mainly made up of sand. In detail, the upper layer 7 is made up of: crushed stone and sand, the volume of which preferably represents between 40% and 90% of the overall volume of the upper layer 7, organic material of vegetable origin, the volume of which preferably represents between 5% and 60% of the overall volume of the upper layer 7, optionally a fraction of sand of volcanic origin, the volume of which preferably represents less than 30% of the overall volume of the upper layer 7, and optionally agricultural soil, the volume of which preferably represents less than 15% of the overall volume of the upper layer 7.

The crushed stone and sand are of a siliceous nature with no active limestone, with pH values preferably comprised between 6.0 and 7.5, more preferably between 6.5 and 6.9. The sand grain size is aptly variable and the particle size curve has a fraction exceeding 85% that is between 0.05 mm and 2.00 mm, preferably between 0.25 mm and 1.20 mm, and a fraction of crushed stone less than 15% measuring between 2 mm and 4 mm.

Said organic material of vegetable origin consists of blond, brown or black peat and possibly, of coconut husks, cork or other organic vegetable material.

The sand of volcanic origin consists of volcanic lapillus and pozzolan, with a particle size of between 0.05 and 3.00 mm.

The upper layer 7 is preferably between 2 cm and 4 cm thick and leaves a portion of the synthetic filaments 2 free, preferably between 1.5 cm and 3 cm in length. Moreover, the layer 7 permits drainage and improves the consistency of the playing surface, in particular to provide a firm support for players during the game, while at the same time promoting the growth of the natural turf.

The lower layer 8 is a draining vegetable layer in contact with the substrate 11. It is preferably made up of inert crushed stone, the volume of which preferably represents less than 90% of the overall volume of the lower layer 8, inert sand, the volume of which preferably represents less than 90% of the overall volume of the lower layer 8, inert material of volcanic origin, the volume of which preferably represents less than 40% of the overall volume of the lower layer 8 and organic material of vegetable origin, the volume of which preferably represents between 5% and 50% of the overall volume of the lower layer 8.

Advantageously, the inert stone is of siliceous origin with no active limestone and pH values comprised between 6.0 and 7.5, preferably between 6.5 and 6.9. Particle size varies between 2 mm and 12 mm, preferably between 3 mm and 8 mm. The sand is silica sand with no active limestone and pH values comprised between 6.0 and 7.5, preferably between 6.5 and 6.9 with variable sizes and a particle size curve having a fraction of more than 85% between 0.05 mm and 2 mm, preferably between 0.25 mm and 1.2 mm. The inert materials of volcanic origin are of the volcanic lapillus and pozzolan type, the particle size of which is comprised between 3 mm and 5 mm. The layer 8 is doubled if the substrate 11 is arid, not water permeable and/or not draining, preferably with crushed silica stone as previously specified or, preferably, with the same material as specified above.

Figure 1:
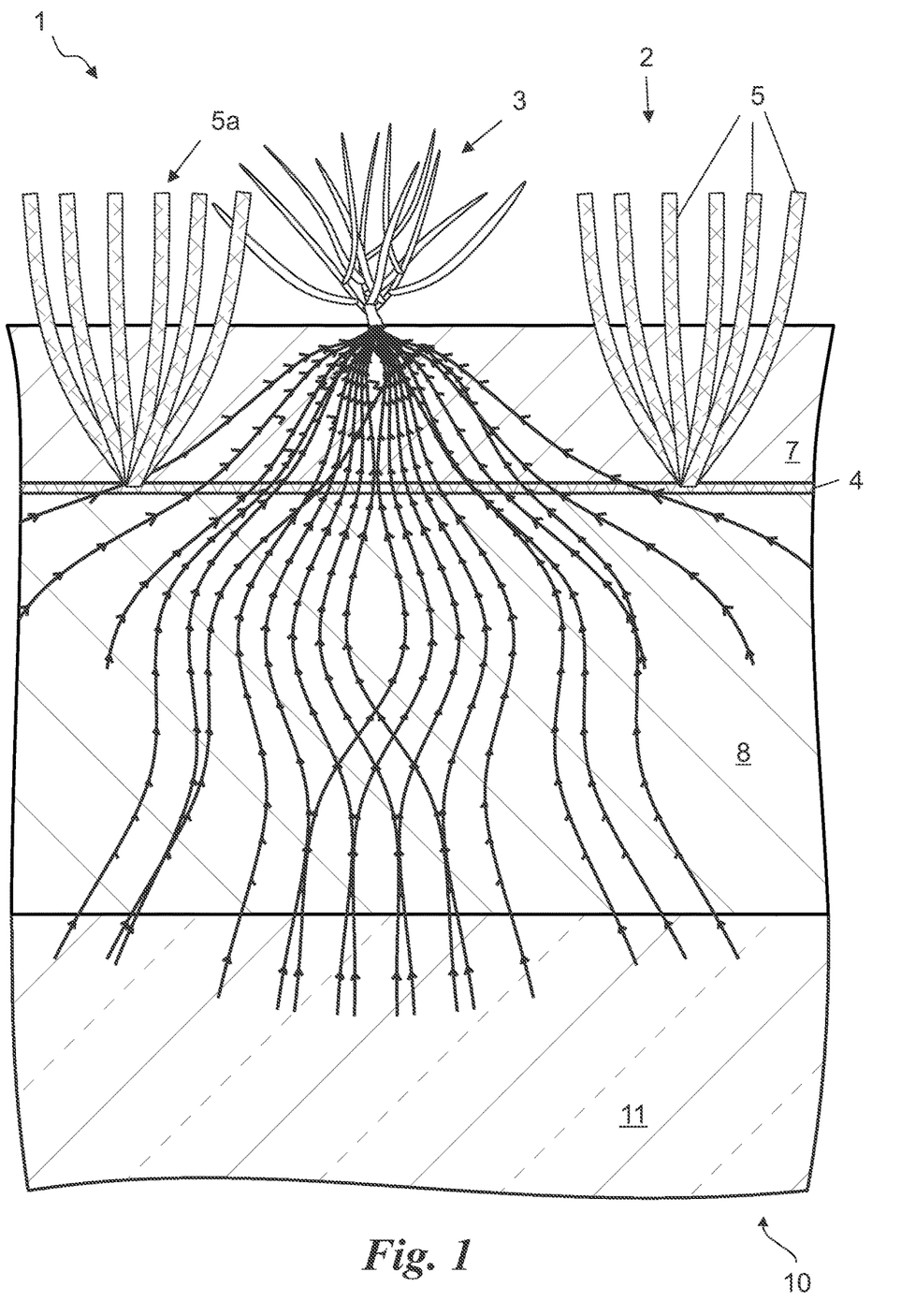
FIG. 1 is a schematic cross-sectional view of the mixed turf according to the invention.

The turf 1 further comprises natural grass 3, as previously specified. In ideal conditions, the natural grass 3 is arranged in the covering 1 together with the synthetic turf 2 and is preferably present with an average density that is between 3 and 10 times higher than the average density of the synthetic turf 2 in the soil 10. The density can be measured visually, for example, by comparing the groups of synthetic filaments 5 and the tufts of natural grass 3. The natural grass is supported by the upper surface of the upper layer 7 and comprises roots that advantageously extend over the whole of the upper layer 7, pass through the backing 4 and also extend along the lower layer 8 (FIG. 1) and preferably also along part of the substrate 11.

Figure 3A:
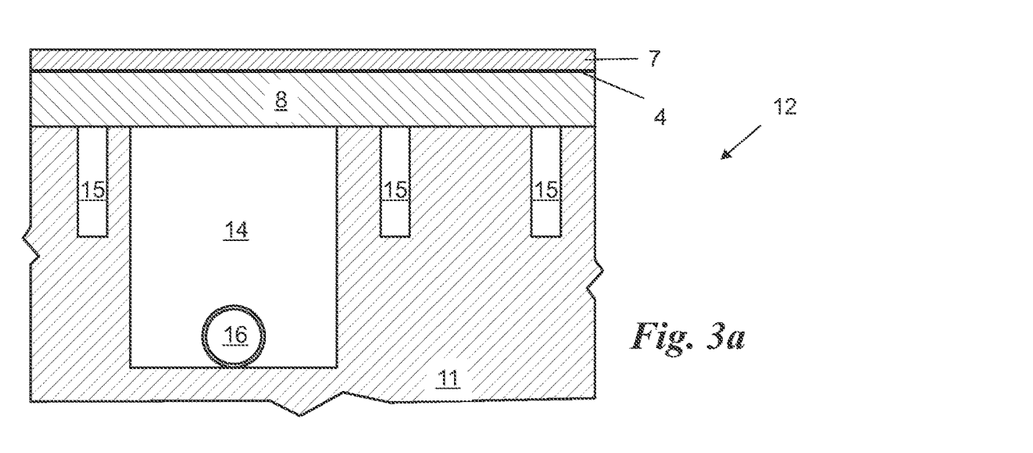
FIG. 3a is a further schematic cross-sectional view of a first example of the mixed turf according to the invention.
Figure 3B:
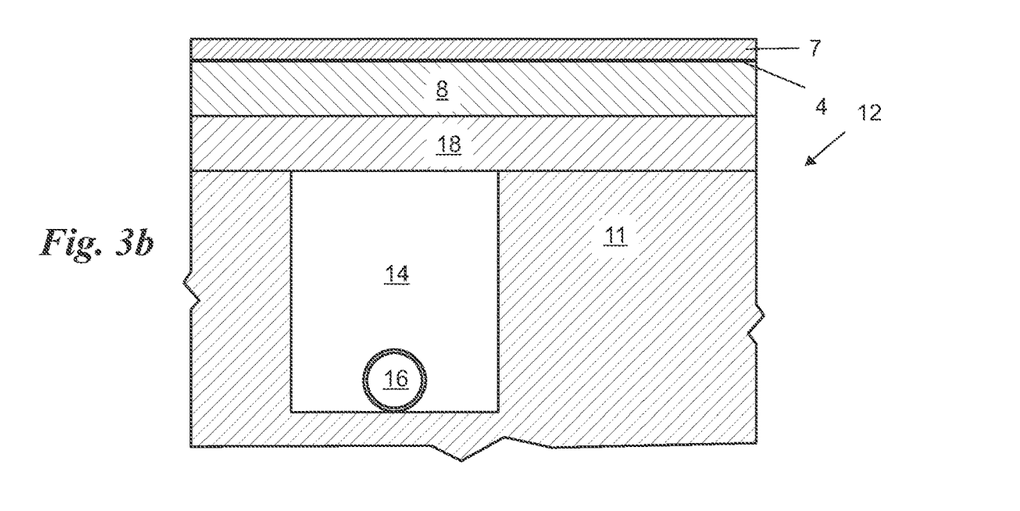
FIG. 3b is a further schematic cross-sectional view of a second example of the mixed turf according to the invention.

The substrate 11 consists of an existing soil, for example an agricultural soil or the like. It comprises a drainage system 12 consisting of trenches of various shapes and sizes, as shown in FIGS. 3 and 4.

Figure 4:
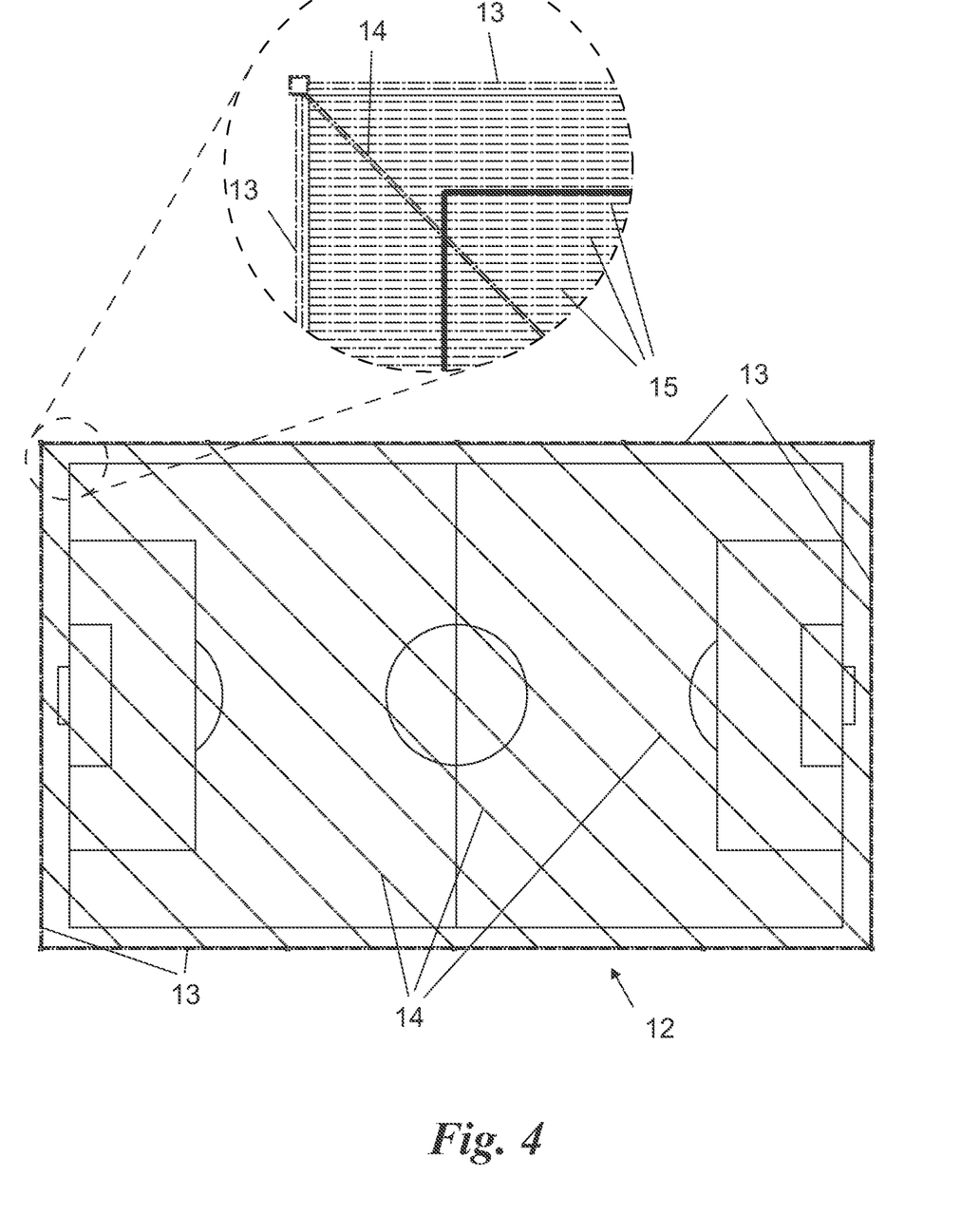
FIG. 4 is a schematic view from above of the mixed turf according to the invention.

In particular, the system 12 comprises perimeter headers 13, arranged around the perimeter of the sports field or the like (FIG. 4) and secondary drainage means 14 extending so as to at least partly join different portions of the perimeter headers and more preferably arranged diagonally with respect to the headers 13 (FIG. 4). Said headers 13 and drainage means 14 extend starting from the upper surface of the substrate 11, bordering on the lower layer 8. They have widths comprised between 5 cm and 60 cm. In particular, the perimeter headers 13 preferably have a rectangular cross-section with a width comprised between 30 cm and 60 cm and a height comprised between 40 cm and 70 cm, while the secondary drainage means 14 also preferably have a rectangular cross-section with a width comprised between 8 cm and 35 cm and a height comprised between 20 cm and 40 cm.

Moreover, both the headers 13 and the drainage means 14 comprise inner pipelines consisting of microperforated pipes 16 laid in trenches of varying sizes and filled with sand, crushed stone or the like.

The drainage system 12 further comprises a plurality of micro-drains 15 connected for fluid passage with said drainage means 14 and consisting of closely spaced trenches arranged between 15 mm and 120 mm apart. They are preferably parallel to each other, perpendicular to the surface slope of the terrain, parallel to the two perimeter headers 13, for example (FIG. 4) the larger headers in the case of a rectangular field. Alternatively, they may be arranged parallel to the surface slope or diagonally with respect to the surface slope of the field in the direction opposite to that of the other diagonal drainage means 14. They too extend starting from the upper surface of the substrate 11 at a depth of between 10 cm and 25 cm and have a width comprised between 2 cm and 6 cm (FIG. 3*a*).

Instead of the micro-drains 15, a continuous and uniform layer of crushed stone 18 may be laid beneath the lower layer 8 (FIG. 3*b*).

Lastly, the turf 1 is provided with an automatic watering system comprising irrigators of the type known in the prior art, with a range of up to 22 m.

The invention comprises a new process for creating a mixed turf 1 described above in a structural sense.

In particular, the process consists of providing the substrate 11 with the drainage system 12 described above, arranging the lower layer 8 on top of this, arranging the synthetic turf 2 over this, covering the synthetic turf with the upper layer 7 and introducing the natural grass 3. The natural grass 3 is preferably introduced and obtained by sowing grass seeds on the spot. Alternatively, the upper layer 7 and the natural grass 3 are obtained in a nursery and subsequently transplanted onto the described structure, after which it is cultivated using the traditional methods used to cultivate turf.

The establishment of the fresh seedlings is aided by the shade provided by the synthetic grass, which also simplifies subsequent maintenance. In cold weather the synthetic yarns protect the seedlings from freezing conditions and facilitate their establishment.

The mixed turf 1 according to the invention and the process described achieves some important advantages. The applicant has found that, surprisingly, the prior art structures comprising backings consisting of substantially impermeable membranes provided with apertures or macroscopic holes did not allow transpiration and gaseous exchange between the soil and the air due to the density of the water and surface tension, which caused the water to be deposited on the backing of the synthetic turf blanket and obstruct said holes or apertures. The applicant therefore unexpectedly discovered that the described backing 4, which is a permeable structure and enables transpiration owing to the microscopic characteristics of the backing 4, which also extend over the whole surface of said backing 4, permits the passage of water and air, contrary to what had been initially thought. Said advantage is due in particular to the described jagged, three-dimensional surface.

With the turf 1, the roots are thus able to proliferate deep in the soil so that the backing is anchored by the roots of the natural grass 3. Thus, owing to the described combination of the synthetic turf 2 and the natural grass 3, the natural grass 3 is able to withstand summer droughts, trampling, and horizontal pull when players fall and skid on the grass, and ensures good playability.

More specifically, the synthetic yarns protect the leaves and especially the crown, which is the most delicate part of the plant. At the same time the roots grow vigorously, extend deep into the soil and cling to the backing 4 thus forming a firm mixed turf that can withstand trampling and players falling and skidding on the turf. Damage resulting from the use of the field is limited, so that a uniform and safe playing surface is maintained, while at the same time saving money in terms of extraordinary maintenance.

The mixed turf 1 is also simple and relatively economical to install. The rainwater is kept in the soil between the micro-drains, excess water is dispersed in the soil and only a minimum amount is drained into the sewer system or the water table.

Moreover, the conformation of the drainage system 12 is particularly suited to the described turf 1, probably due to the described type of backing 4, and permits improved hydration of the natural grass 3.

In particular, the rainwater passes through the upper layer 7, the backing 4 and the lower layer 8, and is conveyed into the micro-drains 15. The function of the lower layer 8 and micro-drains 15 is to rapidly absorb and preserve rain and irrigation water, keeping the soil between the micro-drains 15 moist, so that said water is then returned to the natural grass 3 in the form of moisture thus considerably reducing the amount of water required for irrigation.

This makes it easier to reduce the frequency of watering, a condition that promotes deep, healthy rooting, a fundament requirement in order to improve the strength of the natural turf.

The excess water flows into the headers 13 and drainage means 14 and is drained into the underlying soil so that the rainwater is not carried into the sewer system, which helps to prevent flooding of the covered field in the case of heavy rainfall, while at the same time enabling the roots of the grass plants to grow. Once the roots reach the lower layer 8 or substrate 11, they can better use the water reserves and nutritional elements therein, including those added with manure during subsequent maintenance.

The soil 10 thus obtained does not retain the water and prevents the formation of impermeable barriers due to the effect of its density, so as to preserve two fundamental properties, i.e. permeability and transpiration, even when the soil is too wet, so as to allow the roots of the natural grass to penetrate deeply as far as the original soil.

In the event of heavy rainfall, the infiltration of rainwater through the described upper layer 7 and lower layer 8 is ensured by the porosity formed due to the use of the described particle sizes. In this manner, the grass surface can continue to be used without losing its physical properties during the sports activity.

Modifications and variations may be made to the invention described herein without departing from the scope of the inventive concept as expressed in the independent claims.

The invention claimed is:

1. A mixed turf arranged on a soil, comprising:
    a synthetic turf and
    natural grass arranged in said synthetic turf,
        said synthetic turf, comprising:
            synthetic filaments configured to simulate grass blades and a backing consisting of a membrane supporting said synthetic filaments,
    wherein said backing comprises at least one geonet of polyester and at least one geotextile of non-woven fabric of polyester, said at least one geonet being coupled with said at least one geotextile, said backing is substantially draining and enables transpiration and permits the passage therethrough of the roots of said natural grass, and said backing is non-biodegradable,
    wherein said filaments are inserted between said geonet and said geotextile and are connected to said backing by gluing, with hot melting of polymeric particles.

2. The mixed turf as claimed in claim 1, wherein said backing has a three-dimensional shape and comprises apertures that are not arranged uniformly along a continuous surface but on surfaces at different angles of inclination.

3. The mixed turf as claimed in claim 2, wherein the backing is permeable to water across the whole surface of the backing.

4. The mixed turf as claimed in claim 3, wherein no polyurethane and no latex is applied to the bottom of the backing.

5. The mixed turf as claimed in claim 4, wherein said backing comprises at least one geonet consists of polyester and at least one geotextile of non-woven fabric consists of polyester.

6. The mixed turf as claimed in claim 5, wherein the polymer particles comprise polyethylene.

7. The mixed turf as claimed in claim 1, wherein said backing has a jagged surface.

8. The mixed turf as claimed in claim 1, wherein said backing comprises two of said geonets and two of said geotextiles, said geotextiles constituting the outer faces of the backing and said geonets enclosing said filaments.

9. The mixed turf as claimed in claim 1, wherein said backing comprises open-work fabric comprising first yarns having a diameter comprised between 3 mm and 0.3 mm.

10. The mixed turf as claimed in claim 9, wherein said first yarns have a diameter comprised between 1.8 mm and 0.7 mm.

11. The mixed turf as claimed in claim 9, wherein said first yarns are arranged on two levels so as to form the backing with a three-dimensional open-work fabric.

12. The mixed turf as claimed in claim 1, wherein an arrangement density in the soil of said synthetic filaments is less than between 10% and 30% of an arrangement density of said natural grass.

13. A soil, comprising:
    a mixed turf as claimed in claim 1, further comprising
        an upper layer, comprising sand and arranged on top of said backing,
        a lower layer configured to support said backing and which comes into contact with said backing and with said upper layer, and
        a substrate in contact with at least a portion of said lower layer.

14. The soil as claimed in claim 13, wherein said sand of said upper layer consists of crushed stone and sand having pH values from 6.0 to 7.5 and of which a fraction higher than 85% having a particle size comprised between 0.05 mm and 2.00 mm.

15. A process for creating a mixed turf as claimed in claim 1, wherein said synthetic turf is laid first and then said natural grass is introduced.

16. The process for creating a mixed turf as claimed in claim 15, wherein said natural grass is introduced by sowing on the spot.

17. The process for creating a mixed turf as claimed in claim 1, wherein said natural grass is obtained in a nursery and subsequently transplanted in said turf.

* * * * *